Sept. 12, 1939. W. D. FOSTER Re. 21,204
ARTICLE AND PROCESS FOR MULTIPLYING RECORDS
Original Filed Jan. 10, 1935
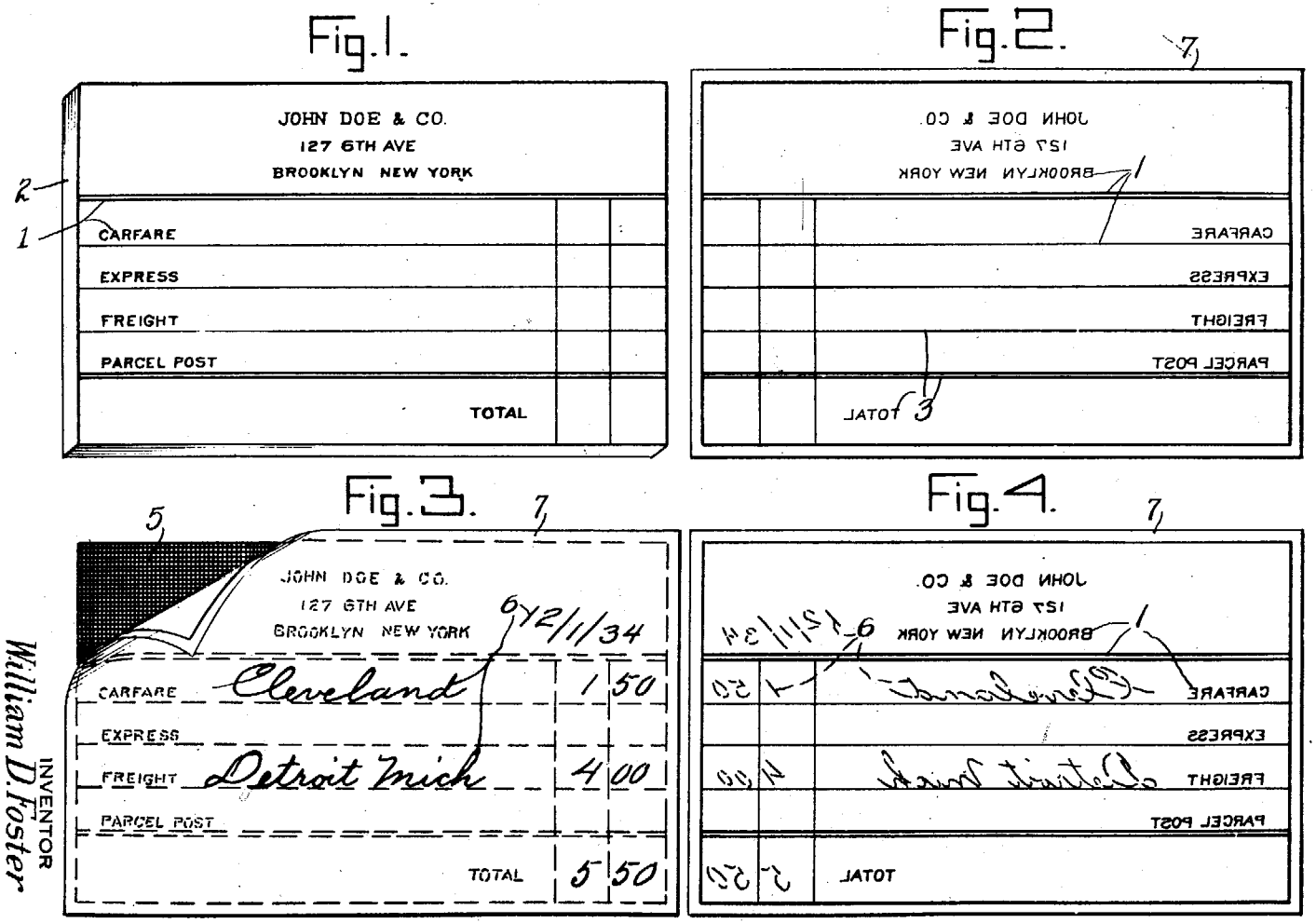
INVENTOR
William D. Foster
BY
Blair, Curtis & Dunne
ATTORNEYS Reissued Sept. 12, 1939

Re. 21,204

UNITED STATES PATENT OFFICE 21,204

ARTICLE AND PROCESS FOR MULTIPLYING RECORDS

William D. Foster, Stewart Manor, N. Y., assignor to Manifold Supplies Company, Brooklyn, N. Y., a corporation of New York Original No. 2,060,190, dated November 10, 1936, Serial No. 1,153, January 10, 1935. Application for reissue November 10, 1938, Serial No. 239,894

9 Claims. (Cl. 101—149.5)

My invention relates to the multiplying of written or printed records and particularly to those multiplying processes wherein a record made on a sheet of paper is applied either directly or indirectly to other sheets of paper by dampening the ink upon the original record and then transmitting a copy-producing portion of this ink either directly to the sheets which are to serve as copies, or else to a prepared apron from which the duplicate copies are taken.

In using an intermediate transfer medium such as the well known gelatin-coated apron, it is necessary either to write or print the original matter in hectographic ink or to make positive copies thereof by means of a hectographic transfer sheet which has been impregnated or coated with a suitable inking medium. However obtained, the original or the positive copy is placed face down and firmly pressed upon the gelatin-coated apron, which has previously been well soaked with water; and after pressure has been applied the gelatin of the apron absorbs ink from the original or the positive copy so as to produce upon the surface of the apron a reverse or negative representation of the written or printed matter of the original. Positive copies may then be taken from the negative apron by pressing thereon paper on which the impression is thus reproduced in positive form.

As above indicated, multiplication of copies may be accomplished without the use of such a transfer medium as just described. In this process for reproducing or making duplicate copies of original matter, either printed or written, the copies are made directly from the rear face of the original sheet, the original sheet having been made in such a manner that the written or printed matter appears upon the rear side of the sheet in reverse or negative configuration or presentation and in registry with the original matter as written or printed upon the front side of the sheet. In this process the matter appearing upon the rear side of the sheet, i. e., the negative matter, is pressed directly by means of suitable apparatus upon copy sheets which have been dampened with a suitable (usually volatile) liquid capable of dissolving the ink applied to the original. This latter process, known in the trade as the "spirit process", may be better understood by reference to United States Letters Patent No. 1,645,930 granted to William Ritzerfeld.

While my present invention may be useful in connection with both of these processes, its more particular object is to provide master sheets having form matter and fill-in matter both in negative or reverse representation on the rear side of the sheet upon the front side of which the original fill-in matter has been written or printed. In the past, in carrying out the process disclosed in the Ritzerfeld patent, when it was desired to make an original master record comprising fill-in matter in appropriate relation to a previously printed form, such as waybills, bills of lading, invoices, etc., it was the practice (in order that the printed matter appear in negative on the rear side of the master sheet) to have each master sheet made with a hectographic copying sheet attached thereto with the inked side of the copying sheet lying against the rear side of the master sheet. The sheet was then printed on a press or otherwise to produce the form matter upon the front side of the sheet in positive presentation and, simultaneously, a negative copy thereof—through the medium of the copying sheet—upon the back side of the sheet. Having thus produced master sheets so far as concerns the printed form matter, these master forms, whether invoice, bill of lading or other form, could be filled in with handwriting or typewriting in the usual manner so that the ink from the ribbon of the typewriter or from the pen of the writer would be impressed upon the front side of the sheet in proper relation to the form matter printed thereon, and a carbon or hectographic copy thereof would be made in negative or reverse configuration upon the rear side of the master sheet—then complete both as to form matter and fill-in matter. Master sheets produced in this manner are expensive and may run as high as five or six cents apiece. Consequently it will be readily understood that where many such master sheets are to be made the expense becomes a considerable item. It is an object of the present invention to produce master sheets having form matter appearing thereon and which will be more effective to produce better copies of the original form matter than could result from the old process, and to do so at but a fraction of the expense involved in using the old process.

In the drawing:

Fig. 1 shows a positive electrotype or other block for printing form matter in negative presentation;

Fig. 2 shows a manifolding master sheet upon the back side of which the form matter has been printed in negative conformation in hectographic ink;

Fig. 3 shows the master sheet and a sheet of hectographic carbon paper assembled to produce upon the back side of the master sheet a negative presentation of the fill-in matter displayed upon the front side thereof; and Fig. 4 shows the back side of the master sheet completed both as to form matter and fill-in matter.

In carrying out my process, the form matter 1 may be reproduced on the usual zinc plate 2 or other similar printing plate or block, the box, lines or printing of the form matter to appear upon the master sheet 7 being produced on the plate in positive presentation so that negative or reverse prints or impressions may be taken therefrom, thus departing from the ordinary practice of printing positive impressions of form matter from negative zinc plates. Having obtained such a positive plate with the proper form matter thereon, I now take negative impressions therefrom upon the sheets of paper that are eventually to become master sheets, as indicated at 3 in Fig. 2, first having inked the printing plate with a suitable hectographic or copying ink. Ordinarily the lines and letters of such a negative impression upon the back of the master sheet will show through to the front or face of the sheet, as indicated by broken lines in Fig. 3, with sufficient clearness so that the sheet may be put in a typewriter together with a sheet of transfer paper 5, or a pen may be used to write in the fill-in matter 6 on the front of the sheet in appropriate relation to the form matter 1 printed in negative on the back, thus producing a complete and accurate negative master copy on the back of the sheet.

In some cases, however, it may be desirable to have the form matter or fill-in matter, or both, appear on both the obverse and reverse sides of the master sheet. In order to produce such a sheet, I mount my plate in the usual manner in any suitable printing press and, having inked the plate, preferably with copying or hectographic ink, first make a negative impression from the positive plate upon the tympan of the press; then, placing the master sheet blank in the press, an operation thereof produces a copy having on one face a positive presentation of the form matter taken from the tympan of the press and in registry therewith, upon the opposite side of the paper, a negative presentation of the form matter taken directly from the positive printing plate.

The printed form matter on the face of the sheet not only aids in the filling in of the fill-in matter in proper relation to the form matter but, if the original fill-in matter is written in copying ink, then duplicate copies may be produced by the use of the positive or front side of the master sheet in the gelatin process referred to above, and—where a hectographic transfer sheet has been used at the back of the master sheet in making the negative impression of the fill-in matter thereupon—the back of the sheet may be printed from directly by the spirit process also referred to above. In other words, I can make, in this manner, a double duty master sheet, capable of use either in the spirit process or the gelatin process.

When, as formerly, matter such as boxes and lines and printing is made by transference of the inking material from hectographic transfer paper, the form matter is often blurred and it is difficult to make clear copies from such a master sheet so made. On the other hand, a master sheet having negative form matter impressed thereon by direct printing from a plate, has the great advantage of clearness of impression. The lines are distinct, the lettering, if printed lettering is included in the form matter, stands out clearly, and many clear copies may be made therefrom by the spirit process.

I do not desire to lay claim broadly to the mere making of a negative impression of the matter to be duplicated on the back of the original master sheet, nor do I seek to claim as new the mere use of a positive original sheet in the making of water press or similar copies; but I believe myself the first to produce a master sheet by printing negative form matter on the reverse side thereof from a printing plate whereupon the form matter is presented positively. Further, I believe it to be new as a process to make duplicate copies of form and fill-in matter by first providing such a positive printing plate, then producing therefrom a negative copying ink impression upon the back of the master sheet, and then making positive duplicate copies of both form and fill-in matter from the back of the master sheet after the original fill-in matter has been made thereon.

I have cited these two aspects of novelty in my invention in order to exemplify some of the advantages attendant upon its use, but these examples are not intended as limitations nor do they include all the points of novelty or utility wherein my invention departs from and is superior to the older processes and the products resulting therefrom.

I claim as my invention:

1. The herein described process of multiplying copies involving the use of a master sheet having form matter and fill-in matter presented in reverse on the back side of said sheet, consisting in preparing a printing plate having the form matter in positive presentation thereon, printing from said plate the form matter with a rectographic ink in reverse presentation upon the back side of said sheet, placing the sheet reverse side down upon a surface coated with a hectographic medium, making the original of the fill-in matter on the front side of the said sheet to cause a reverse duplicate to be formed from said coated surface on the back side of said sheet, placing a moistened copy sheet on said back side of said master sheet, and transferring by pressure both the form and fill-in matter from the back side of said master sheet to said copy sheet.

2. The herein described process of producing a master sheet for duplicating, consisting in printing from a positive plate form matter in negative presentation on the back side of said sheet with hectographic ink, placing the back side of the sheet upon a surface coated with a hectographic medium, and producing original fill-in matter on the front side of the sheet in a manner to cause a negative copy of said fill-in matter to be made from said coated surface upon the back side of said sheet in appropriate relation to the negative form matter previously printed thereon.

3. The herein described process of copying, consisting in preparing an original sheet with form matter in reverse presentation printed by means of a positive plate on the back face of said sheet with hectographic ink, placing the back side of the sheet upon a surface coated with a hectographic coating medium, producing original fill-in matter on the front side of the sheet in a manner to cause a negative copy of said fill-in matter to be made from the coated surface on the back side of said sheet in appropriate relation to the negative form matter previously printed thereon, placing a moistened copy sheet on said back side of said original sheet and subjecting such sheets to pressure to cause the reverse matter on the back side of the original sheet to be reproduced in positive presentation upon the blank sheet.

4. The process of making a master sheet for hectographic duplicating which includes the steps of applying hectographic printing ink to a plate having form matter in positive arrangement thereon and applying a deposit of said hectographic ink on one side of said master sheet directly from said plate to define thereon a negative presentation of said form matter.

5. The process of copying which includes the steps of providing portions of one surface of a master sheet with a deposit of hectographic printing ink to define form matter in reverse presentation thereon, applying to other portions of said surface a deposit of hectographic transfer ink by pressure contact of said surface with a transfer sheet having a coating of hectographic transfer ink to produce desired fill-in matter in reverse presentation on said master sheet, and bringing said deposits of hectographic printing and transfer inks into engagement with a moistened copy sheet to produce thereon an imprint of said form and fill-in matter.

6. As an article of manufacture, a sheet adapted to receive data on one side and having on the other side a deposit of hectographic printing ink defining form matter in negative presentation, said deposit being adapted to produce repeated prints of said form matter when said sheet is normally employed as a master sheet in the so-called spirit process of multiplying copies.

7. The process of making a master sheet for spirit dulplicating which includes the steps of applying hectographed printing ink to a plate having matter in positive arrangement thereon, and applying a deposit of said hectographic ink on one side of said master sheet directly from said plate to define thereon a negative presentation of said matter.

8. The process of making a master sheet for spirit duplicating which includes the steps of preparing a printing plate having matter in positive arrangement thereon, applying hectographic printing ink to said plate, and applying a deposit of said hectographic ink on one side of said master sheet directly from said plate to define thereon a negative presentation of said matter.

9. As an article of manufacture, a sheet having on one side a directly printed deposit of hectographic printing ink defining matter in negative presentation, said deposit being adapted to produce repeated prints of said matter when said sheet is normally employed as a master sheet in the so-called spirit process of multiplying copies.

WILLIAM D. FOSTER.